US009787820B2

(12) United States Patent
Vohra et al.

(10) Patent No.: US 9,787,820 B2
(45) Date of Patent: Oct. 10, 2017

(54) NAVIGATING BETWEEN A MOBILE APPLICATION AND A MOBILE BROWSER

(71) Applicant: LinkedIn Corporation, Mountain View, CA (US)

(72) Inventors: Rahul Vohra, San Francisco, CA (US); Martin Alexander Kleppmann, Kingston upon Thames (GB); Lee Mallabone, San Francisco, CA (US)

(73) Assignee: LinkedIn Corporation, Sunnyvale, CA (US)

( * ) Notice: Subject to any disclaimer, the term of this patent is extended or adjusted under 35 U.S.C. 154(b) by 39 days.

(21) Appl. No.: 14/193,314

(22) Filed: Feb. 28, 2014

(65) Prior Publication Data

US 2015/0046848 A1     Feb. 12, 2015

Related U.S. Application Data

(60) Provisional application No. 61/863,155, filed on Aug. 7, 2013.

(51) Int. Cl.
*G06F 3/048* (2013.01)
*G06F 3/00* (2006.01)
(Continued)

(52) U.S. Cl.
CPC ... *H04M 1/72561* (2013.01); *H04M 1/72522* (2013.01); *H04M 1/72552* (2013.01)

(58) Field of Classification Search
CPC . G06F 3/048; G06F 3/00; G06F 17/30; G06F 17/00
(Continued)

(56) References Cited

U.S. PATENT DOCUMENTS 7,176,949 B1 *   2/2007   Moser ................ G09B 7/00
                                                    434/322
7,484,220 B2 *   1/2009   Kelley ................ G06F 9/4843
                                                    714/15

(Continued)

OTHER PUBLICATIONS

Navigation Overview, Feb. 2, 2013, Microsoft VS Studio Developer Library, pp. 1-31.*

*Primary Examiner* — Jennifer To
*Assistant Examiner* — Hugo Molina
(74) *Attorney, Agent, or Firm* — Schwegman Lundberg & Woessner, P.A.

(57) ABSTRACT

Methods and systems of navigating between a mobile application and a mobile browser are described. In some embodiments, it is determined that an action has been performed within a mobile application on a mobile device to launch a mobile browser on the mobile device. An identifier for the mobile application is then registered with an operating system of the mobile device, and a navigation element of the mobile browser is associated with the registered identifier. The mobile application can then be re-launched in response to receiving an indication of a selection of the navigation element within the mobile browser. In some embodiments, the identifier is a uniform resource identifier (URI). In some embodiments, associating the navigation element of the mobile browser with the registered identifier comprises modifying a browser history of the mobile browser. In some embodiments, the navigation element is a selectable back button.

12 Claims, 8 Drawing Sheets

(51) Int. Cl.
*G06F 17/30* (2006.01)
*G06F 17/00* (2006.01)
*H04M 1/725* (2006.01)

(58) Field of Classification Search
USPC .......................................................... 715/760
See application file for complete search history.

(56) References Cited

U.S. PATENT DOCUMENTS

| | | | |
|---|---|---|---|
| 8,745,018 B1* | 6/2014 | Singleton | G06F 17/30899 707/705 |
| 2005/0091658 A1* | 4/2005 | Kavalam | G06F 21/31 718/104 |
| 2005/0132297 A1* | 6/2005 | Milic-Frayling | G06F 17/30873 715/745 |
| 2006/0224960 A1* | 10/2006 | Baird-Smith | G06F 17/30876 715/700 |
| 2007/0028170 A1* | 2/2007 | Wessling | G06Q 10/10 715/705 |
| 2008/0134049 A1* | 6/2008 | Gupta | G06F 9/4843 715/738 |
| 2009/0327953 A1* | 12/2009 | Honkala et al. | 715/804 |
| 2013/0227463 A1* | 8/2013 | Andersson Reimer | G06F 3/04842 715/779 |
| 2014/0040876 A1* | 2/2014 | Morley | G06F 8/61 717/172 |
| 2014/0068424 A1* | 3/2014 | Dhanani | G06F 3/0483 715/251 |

\* cited by examiner

NAVIGATING BETWEEN A MOBILE APPLICATION AND A MOBILE BROWSER

CROSS-REFERENCE TO RELATED APPLICATIONS

This application claims priority to U.S. Provisional Application No. 61/863,155, filed on Aug. 7, 2013, and entitled, "NAVIGATING BETWEEN A MOBILE APPLICATION AND A MOBILE BROWSER," which is hereby incorporated by reference in its entirety as if set forth herein.

TECHNICAL FIELD

The present application relates generally to mobile devices. More specifically, the present disclosure relates to methods, systems and computer program products for navigating between a mobile application and a mobile browser within a mobile operating system.

BACKGROUND

At times, when a user selects certain content displayed by a page of a mobile application (mobile "app") or other resource, the mobile application will move the user to an experience provided by a mobile browser (e.g., a web page displayed by the mobile browser) in order to take advantage of the capabilities of the browser. For example, selecting a link within a content stream presented by a social network service's mobile application may cause a mobile operating system (mobile OS) to launch a mobile browser native to the mobile OS in order to display the web page associated with the link, thereby taking advantage of the fact that the mobile browser may be more powerful than the mobile application, that the mobile browser may provide unique capabilities (e.g., the ability to store and utilize cookies), and that the mobile browser may have access to a larger corpus of content or information, as well as other advantageous capabilities.

However, there are few suitable mechanisms that facilitate returning the user back to the mobile application experience from which they came, once the user is moved into the mobile browser experience. Typically, the user will perform actions that end or pause a current interaction with the mobile browser, re-launch the mobile application, and navigate within the mobile application, in order to go back to their original mobile application interaction.

BRIEF DESCRIPTION OF THE DRAWINGS

Some embodiments of the present disclosure are illustrated by way of example and not limitation in the figures of the accompanying drawings, in which like reference numbers indicate similar elements, and in which.

DETAILED DESCRIPTION

Figure 1:
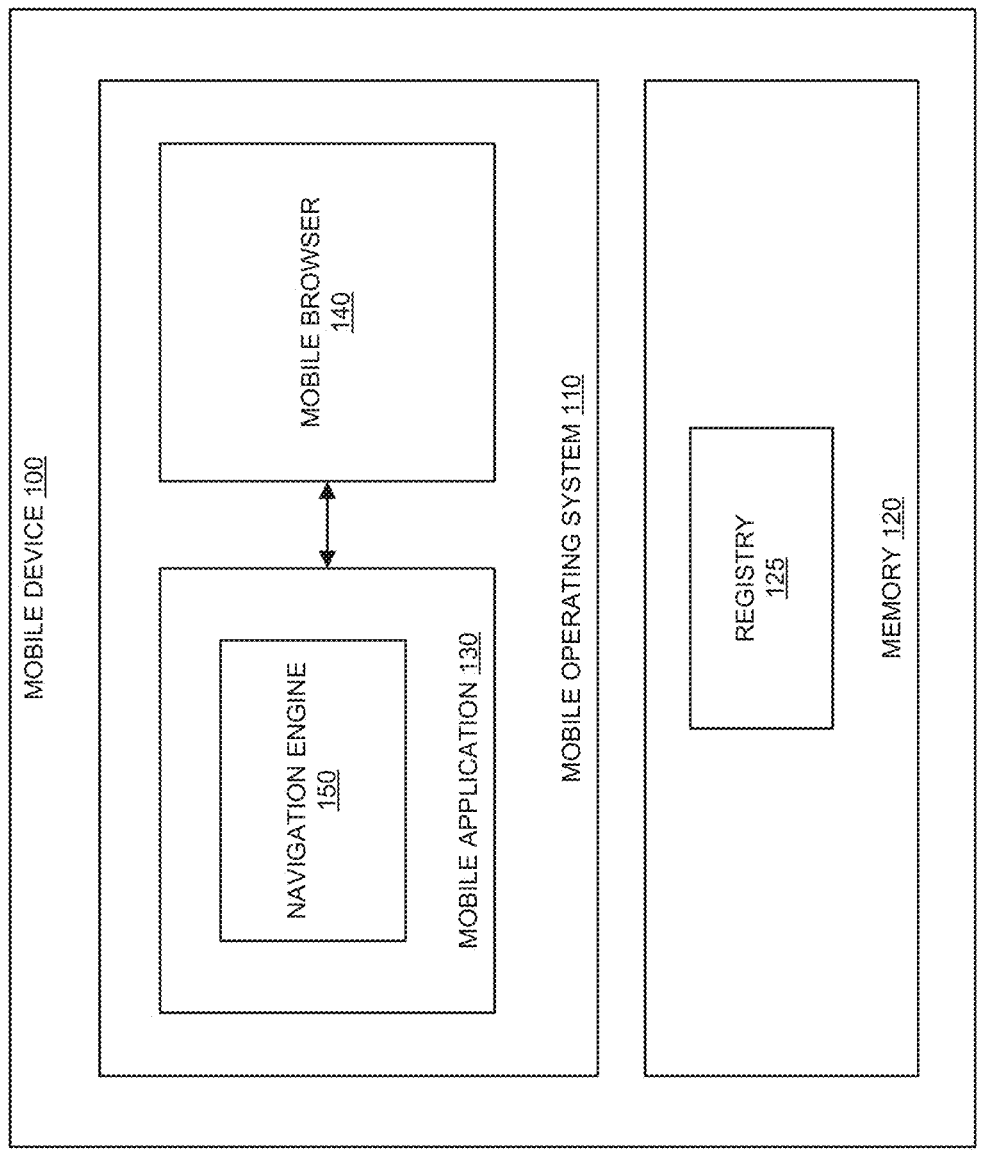
FIG. 1 is a block diagram illustrating various functional components of a mobile computing environment, in accordance with some embodiments.

Example methods and systems of navigating between a mobile application and a mobile browser are described. In the following description, for purposes of explanation, numerous specific details are set forth in order to provide a thorough understanding of example embodiments. It will be evident, however, to one skilled in the art that the present embodiments may be practiced without these specific details.

The present disclosure describes methods, systems, and computer program products, which individually provide functionality for navigating between resources of a mobile operating system (mobile OS), such as between a mobile application and a mobile browser supported by the mobile operating system.

In some example embodiments, the systems and methods may register an identifier, such as a uniform resource identifier (URI), for a mobile application within an operating system of the mobile device, and associate a navigation element of a mobile browser (e.g., a back button) with the registered identifier. The systems and methods may access the identifier registered for the mobile application, and modify a browser history of the mobile browser in order to associate the navigation element with the identifier. Thus, when the navigation element (e.g., back button) is selected, such as by a user, the mobile operating system may transfer the user from a current mobile browser experience to a previous mobile application experience, among other things.

In some example embodiments, the systems and methods may determine that an action has been performed within a resource (e.g., mobile app) of a mobile operating system, where the action causes the mobile operating system to launch a mobile browser of the mobile operating system. The systems and methods may associate an identifier registered to the resource with a back button of the mobile browser, receive a selection of the back button within the mobile browser, and re-launch the resource at a page within the resource that is associated with the identifier.

Therefore, in some example embodiments, the systems and methods may facilitate the re-launching of a mobile application based on an action performed within a mobile browser (e.g., user selection of a back button), which enables a user to navigate back and forth between a mobile browser experience and a mobile application experience in a seamless and efficient manner, among other benefits.

In some embodiments, a method comprises determining that an action has been performed within a mobile application on a mobile device to launch a mobile browser on the mobile device, registering an identifier for the mobile application with an operating system of the mobile device, and associating a navigation element of the mobile browser with the registered identifier.

In some embodiments, the identifier is a uniform resource identifier (URI). In some embodiments, the navigation element is a selectable back button. In some embodiments, the action comprises a selection of a selectable link presented within the mobile application.

In some embodiments, associating the navigation element of the mobile browser with the registered identifier comprises modifying a browser history of the mobile browser. In some embodiments, modifying the browser history of the mobile browser comprises rewriting the browser history. In some embodiments, modifying the browser history of the mobile browser comprises creating a new entry for the browser history.

In some embodiments, the method further comprises receiving an indication of a selection of the navigation element within the mobile browser, and re-launching the mobile application in response to receiving the indication of the selection of the navigation element.

In some embodiments, the method further comprises displaying information indicating that the navigation element is associated with returning to (e.g., configured to restore) a previous mobile application experience from which the mobile browser was launched on the mobile device.

The methods or embodiments disclosed herein may be implemented as a computer system having one or more modules (e.g., hardware modules or software modules). Such modules may be executed by one or more processors of the computer system. The methods or embodiments disclosed herein may be embodied as instructions stored on a machine-readable medium that, when executed by one or more processors, cause the one or more processors to perform the instructions.

In the following description, for purposes of explanation, numerous specific details are set forth in order to provide a thorough understanding of the various aspects of different embodiments of the present invention. It will be evident, however, to one skilled in the art, that the subject matter of the present disclosure may be practiced without all of the specific details.

As described herein, a mobile operating system provided by a mobile device may provide various resources, such as mobile browsers, mobile applications, widgets and so on, and may navigate users between the resources, and otherwise within the mobile operating system, in a variety of ways. FIG. 1 is a block diagram illustrating various functional components of a mobile computing environment, consistent with some embodiments.

The mobile computing environment may be provided and/or supported by various hardware, such as a mobile device 100 that includes a processor configured to process and execute instructions presented by resources located within a mobile operating system 110 and/or instructions stored in memory 120 of the mobile device 100. Example mobile devices include tablet computers, mobile phones (e.g., smart phones), personal digital assistants, personal audio or video players, global positioning devices, laptop computers, digital cameras, mobile gaming devices, wearable computing devices, and/or other devices or machines capable of supporting a mobile operating system, including mobile applications and other resources, and executing instructions (sequential or otherwise) that specify actions to be taken by the devices.

As shown in FIG. 1, the mobile operating system 110 includes various computing resources, such as a mobile application 130 and a mobile browser 140. The mobile operating system 110 can facilitate the navigation between these resources by utilizing various configuration settings and options stored within a registry 125 of the memory 120, or other databases (not shown) within the memory 120, such as databases that store preferences or other configuration information. While specific reference is made herein to a mobile application 130, it is contemplated that the method, processes, and techniques disclosed herein can also be applied to any computing resources of a mobile device 100.

In some example embodiments, the mobile application 130 includes a navigation engine 150 that is configured to facilitate navigation between a computing experience provided by the mobile application 130 and a computing experience provided by the mobile browser 140, such as navigation from a current mobile browser experience back to a previous mobile application experience. For example, the navigation engine 150 can associate the mobile application 130 with a navigation element of the mobile browser 140, which enables the mobile browser 140 to return a user from the mobile browser 140 to the mobile application 130 when the navigation element is selected or otherwise activated by the user.

The navigation engine 150 may be implemented and/or provided as part of the mobile application 130, as a plugin for the mobile application 130 (e.g., as a plugin for a mobile e-mail client), and in other ways. In some example embodiments, the mobile browser 140 and/or other resources within the mobile operating system 110 may provide the navigation engine 150.

Figure 2:
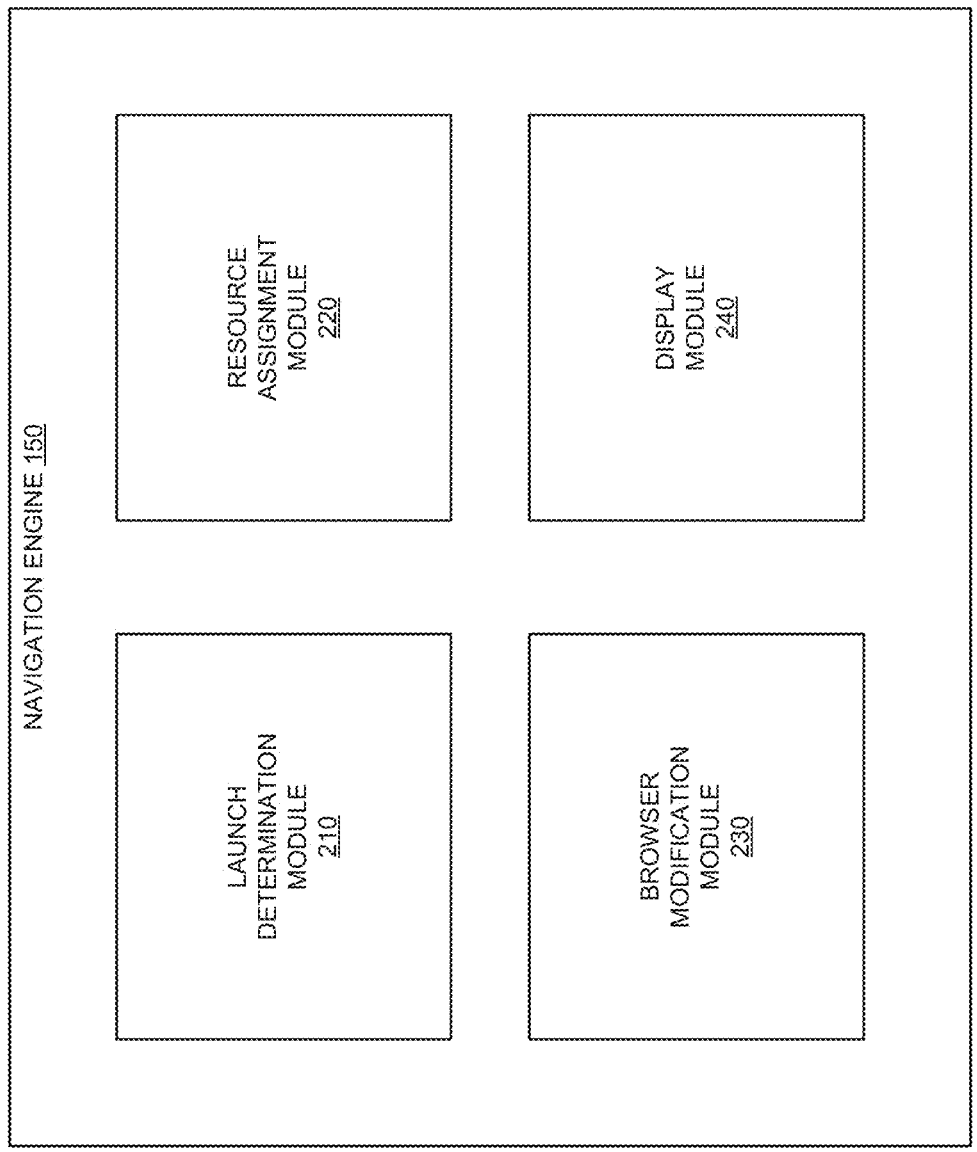
FIG. 2 is a block diagram illustrating modules of a navigation engine, in accordance with some embodiments.

As described herein, in some example embodiments, the navigation engine 150 enables the mobile operating system 110 to transfer a user from the mobile browser 140 to the mobile application 130, among other things. FIG. 2 is a block diagram illustrating example modules of the navigation engine 150, consistent with some embodiments.

As illustrated in FIG. 2, the navigation engine 150 can include a variety of functional modules. One skilled in the art will appreciate that the functional modules may be implemented with a combination of software (e.g., executable instructions, or computer code) and hardware (e.g., at least a memory and processor). Referring to FIG. 2, the navigation engine 150 can include a launch determination module 210, a resource assignment module 220, a browser modification module 230, and a display module 240.

In some embodiments, the launch determination module 210 is configured to determine that a mobile browser (e.g., mobile browser 140) has been launched. In some embodiments, the launch determination module 210 is configured to determine that an action has been performed within a mobile application (e.g., mobile application 130) on a mobile device (e.g., mobile device 100) to launch a mobile browser on the mobile device. For example, the launch determination module 210 may determine that a certain action within the mobile application 130 has been performed, such as selection by a user of a link or other user-selectable content presented by a page of the mobile application 130. It is contemplated that other types of actions to launch a web browser are also within the scope of the present disclosure.

In some embodiments, the resource assignment module 220 is configured to register an identifier for the mobile application 130 with the operating system 110 of the mobile device. In some embodiments, the identifier is a URI. The resource assignment module 220 can generate and/or assign a URI for the mobile application 130, and register the URI for the mobile application 130 within the registry 125 or within other similar mobile operating system databases. In some embodiments, the URI for the mobile application 130 may be a URI for a page currently presented by the mobile application 130.

For example, the resource assignment module 220 may generate a URI having a scheme, such as: "mailclient:username" for an email application, "mailclient:username#page23" for a certain page within the email application, and "map:location" for a mapping application. The resource assignment module 220 can register the generated URI with the registry 125. The resource assignment module 220 may generate the URIs schemes and/or utilize predetermined URI schemes, such as the URI schemes found in the registry of URI schemes maintained by the Internet Assigned Numbers Authority (IANA). The URIs may comprise application uniform resource locators (URLs) and custom URLs. It is contemplated that other types of identifiers may be used and are within the scope of the present disclosure.

In some example embodiments, the browser modification module 230 is configured to associate a navigation element of the mobile browser 140 with the registered uniform resource identifier. In some embodiments, the navigation element can be any user interface element that enables a user to navigate information resources via user direction. In some embodiments, the navigation element comprises a selectable back button of the mobile browser 140 or a gesture-based navigation element (e.g., a swipe of a screen of the mobile device) of the mobile browser 140. Other types of navigation elements are also within the scope of the present disclosure.

The browser modification module 230 can access the URI registered for the mobile application 130, and modify a browser history of the mobile browser 140 to associate the navigation element with the URI. For example, the browser modification module 230 can associate the navigation element with the URI by rewriting a browser history of the mobile browser 140 using a pushState( ) function or other similar function, such as the pushState( ) function supported in the HTML5 history API, having the following scheme: history.pushState(null, null, "URI assigned to the mobile app"). As another example, the browser modification module 230 may associate the navigation element with the URI by creating a new browser history entry for the URI within the browser history of the mobile browser 140 by using URL fragments and JavaScript, among other techniques.

In some embodiments, the display module 240 is configured to display information that indicates that the navigation element is associated with re-launching of the mobile application 130. For example, the display module 240 may cause a graphical element or other information to be displayed along with and/or proximate to a back button of the mobile browser 140 or along with a gesture tutorial element. This information can identify the navigation element(s) as being associated with returning back to a previous mobile application experience.

Figure 3:
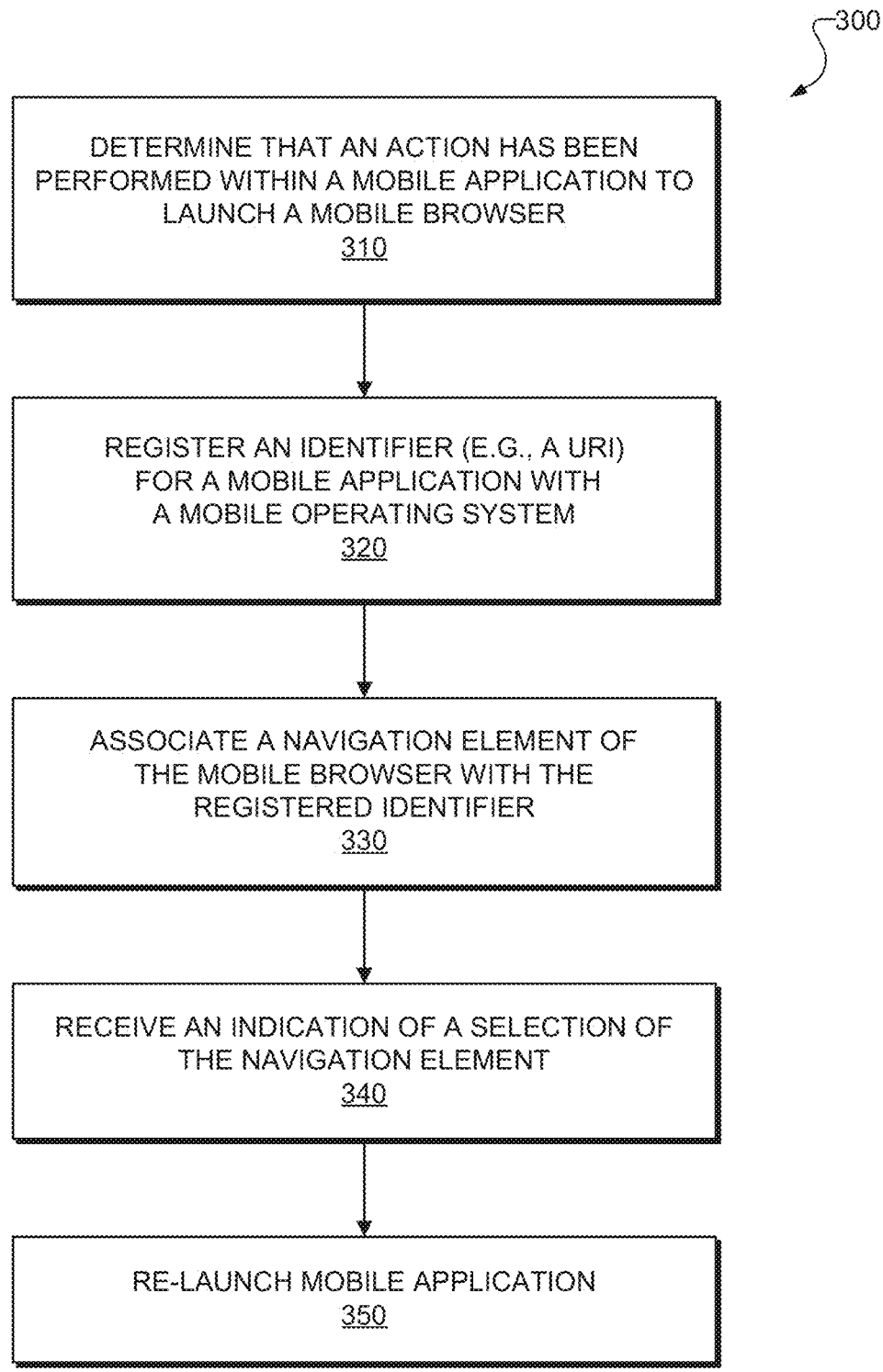
FIG. 3 is a flow diagram illustrating a method for navigating between a mobile browser experience and a mobile application experience, in accordance with some embodiments.

Thus, in some embodiments, the navigation engine 150 performs various methods and/or processes to navigate between a current mobile browser experience and a previous mobile application experience. FIG. 3 is a flow diagram illustrating a method 300 for navigating between a mobile browser experience and a mobile application experience, consistent with some embodiments. It is contemplated that the operations of method 300 may be performed by a system or components of a system (e.g., navigation engine 150). It will be appreciated that the method 300 may be performed on any suitable hardware. Although operations are described below as being performed by the navigation engine 150 and its modules, it is contemplated that other systems, engines, and/or modules may perform these operations as well.

At operation 310, the navigation engine 150 determines that the mobile browser 140 has been launched on the mobile device 100. For example, the launch determination module 210 may determine that a certain action within the mobile application 130 has been performed, such as that a link or other user-selectable content presented by a page of the mobile application 130 that is associated with presenting content within the mobile browser 140 has been selected by a user. In some embodiments, the mobile application 130 comprises an e-mail application. However, it is contemplated that the mobile application 130 may comprise other types of applications as well.

At operation 320, the navigation engine 150 registers an identifier for the mobile application 130 within an operating system 110 of the mobile device 100. For example, the resource assignment module 220 may generate and/or assign a URI for the mobile application 130 (or for a page currently presented by the mobile application 130), and register the URI for the mobile application 130 within the registry 125 or other databases of the mobile OS 110.

In some embodiments, the registering of the identifier for the mobile application 130 within the operating system 110 at operation 320 may be performed before operation 310, where it has been determined that an action has been performed within mobile application 130 to launch mobile browser 140. For example, operation 320 may be performed during or shortly after the installation of mobile application 130 on mobile device 100.

At operation 330, the navigation engine 150 associates a navigation element of the mobile browser 140 with the identifier. Examples of navigation elements include, but are not limited to, a user-selectable back button and a gesture-based element that identifies navigation gestures (e.g., swiping, pinching, etc.) performed by users. In some embodiments, the browser modification module 230 may associate the navigation element with the identifier by modifying a browser history of the mobile browser 140, such as via rewriting a browser history of the mobile browser 140 using a pushState( ) function or other similar function, and/or via creating a new browser history entry for the uniform resource identifier within the browser history of the mobile browser 140 by using URL fragment identifiers and JavaScript, among other techniques.

This associating operation 330 can be conditioned upon a determination that an identifier for the mobile application 130 has been registered with the operating system 110 of the mobile device. This determination can be made be by one or more components of navigation engine 150. If a determination has been made that no identifier for the mobile application 130 has been registered with the operating system 110 of the mobile device 100, then an alternative solution may be provided, as will be discussed later with respect to FIGS. 5-6.

At operation 340, the navigation engine 150 receives an indication of a selection of the navigation element within the mobile browser 140. For example, the navigation engine 150 may receive an indication that a user-selectable back button associated with the identifier has been selected within the mobile browser 140.

At operation 350, the navigation engine 150 re-launches the mobile application 130 on the mobile device 100 in response to receiving the indication of the selection of the navigation element. For example, if the mobile application 130 comprises an e-mail client application from which the user originally performed an action that launched the mobile browser 140, then the navigation engine 150 can then re-launch the e-mail client application in response to receiving the indication of the selection of the navigation element.

It is contemplated that the operations of method 300 may incorporate any of the other features disclosed herein.

Figure 4B:
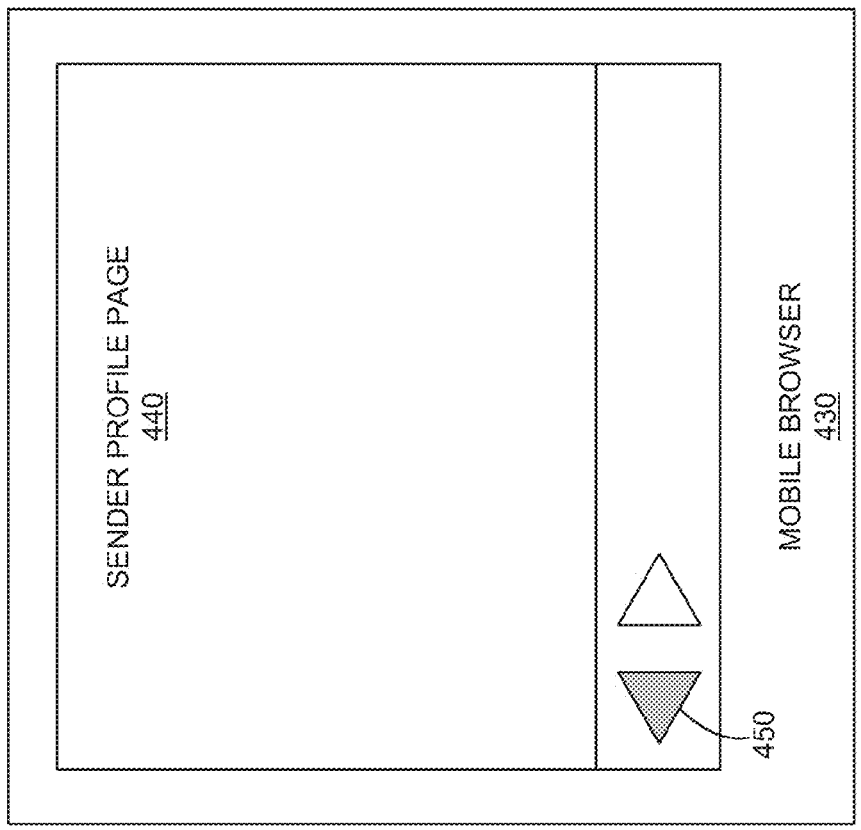
FIGS. 4A-4B are display diagrams illustrating navigation between a mobile application and a mobile browser within a mobile operating system, in accordance with some embodiments.
Figure 4A:
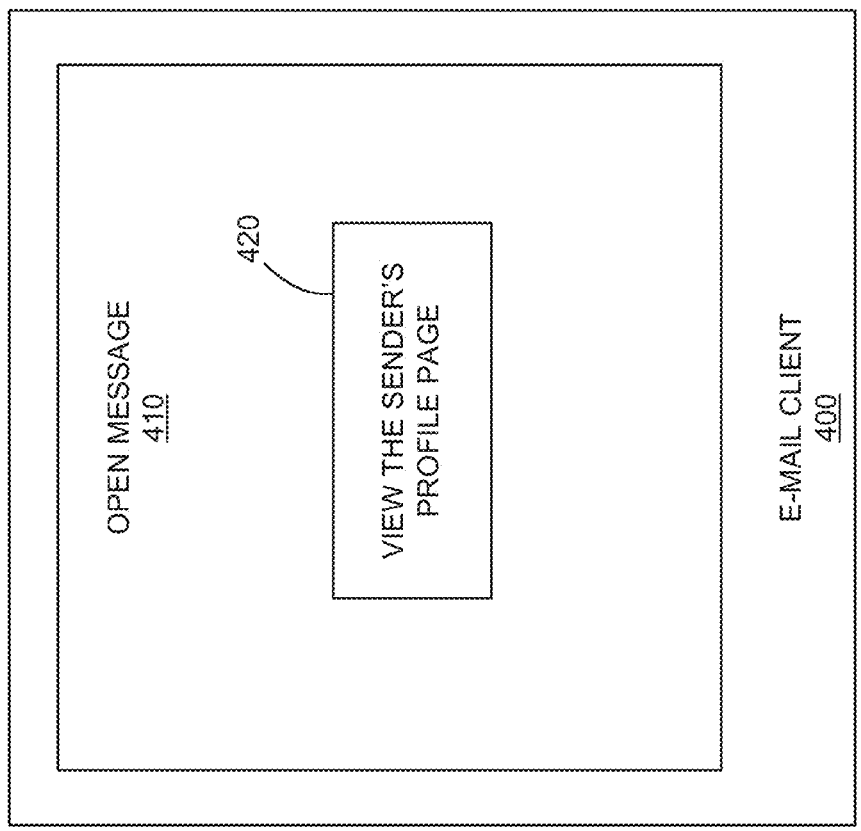

FIGS. 4A-4B are display diagrams illustrating navigation between a mobile application, which is an e-mail client application 400 in this example, and a mobile browser 430 within a mobile operating system of a mobile device, in accordance with some embodiments. In FIG. 4A, the e-mail client application 400 is displaying a selectable message 420 within an open message 410 retrieved from an inbox of a user's e-mail account. In this example, the selectable message 420 comprises a prompting ("VIEW THE SENDER'S PROFILE PAGE") to view a profile page of the sender of the open message 410. The selectable message 420 may comprise a selectable portion, such as a selectable graphical element or text, that, when selected, is configured to cause a mobile browser 430 to launch and present content associated with a social network profile page 440 of the sender of the open message 410, as shown in FIG. 4B. A navigation element, such as back button 450 of the mobile browser 430 can be associated with an identifier that has been registered for the display of the open message 410 within the e-mail client application 400. As a result of this association, when a user selects the back button 450 from the mobile browser 430, the e-mail client application 400 may be re-launched on the mobile device, with the open message 410 being displayed once again on the display screen of the mobile device. Thus, in some example embodiments, the systems and methods described herein facilitate the re-launching of a mobile application based on an action performed within a mobile browser (e.g., user selection of a back button), which enables a user to navigate back and forth between a mobile browser experience and a mobile application experience in a seamless and efficient manner, among other benefits.

In some embodiments, the navigation engine 150 may display information that indicates the navigation element is associated with re-launching of the mobile application. This solution may be useful in situations where a determination has been made that no identifier for the mobile application has been registered with the operating system 110 of the mobile device 100. For example, if the mobile application is the built-in e-mail client of the operating system of the mobile device, then it may not be possible to register an identifier for returning from the mobile browser to the e-mail client. In this example, the history manipulation described herein can still be performed, but when the user selects the back button, he or she cannot be automatically taken back to the e-mail client because there is no identifier to return to. However, the features of the present disclosure can include displaying to the user an informative message explaining to the user how to go back to the e-mail client (e.g., "double-tap the home button").

Figure 5:
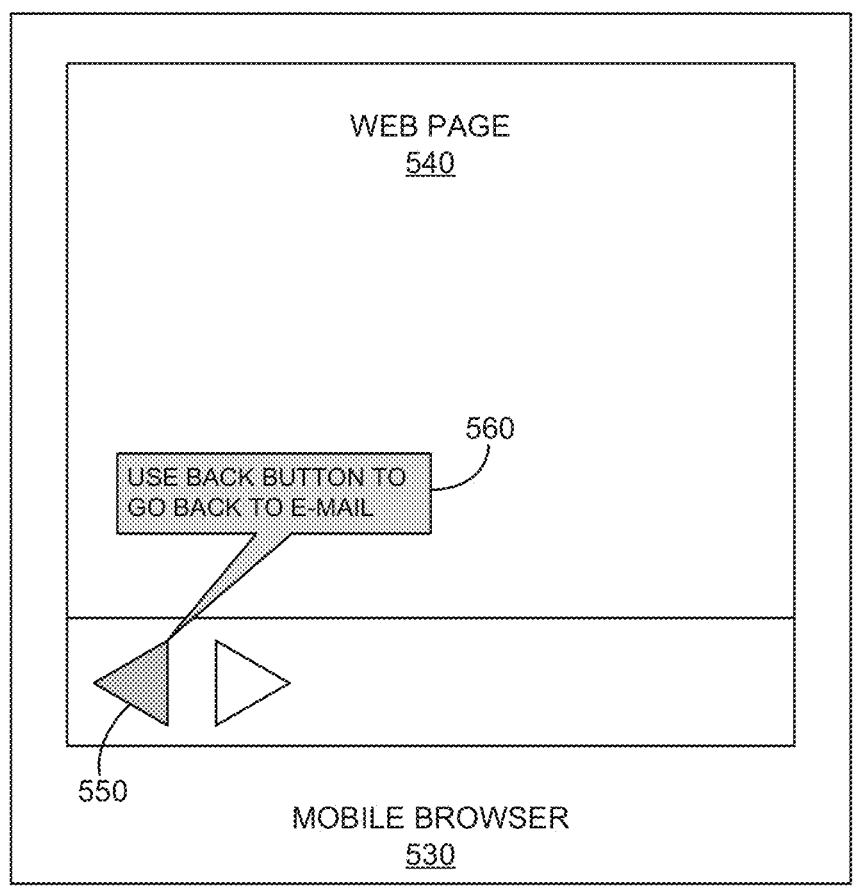
FIG. 5 is a display diagram illustrating a display of instructions to a user, in accordance with some embodiments.

FIG. 5 depicts a user interface of a mobile browser 530 displaying instructions to a user, in accordance with some embodiments. After associating a user-selectable back button 550 of the mobile browser 530 with an identifier corresponding to the re-launching of the mobile application (e.g., by using the various techniques described herein), the navigation engine 150, via the display module 240, can cause the mobile browser 530, which is currently displaying a web page 540, to display a graphical element 560 that identifies the back button 550 as being available to navigate back from the current mobile browser experience to a previous mobile application experience, such as an e-mail client application. In some cases, the navigation engine 150 may be unsuccessful in registering a URI or other identifier for the mobile application 130. In such cases, the navigation engine 150, via the display module 240, can present content, such as graphical element 560, that provides information to a user regarding how the user can return from the current mobile browser experience back to a previous mobile application experience.

Figure 6:
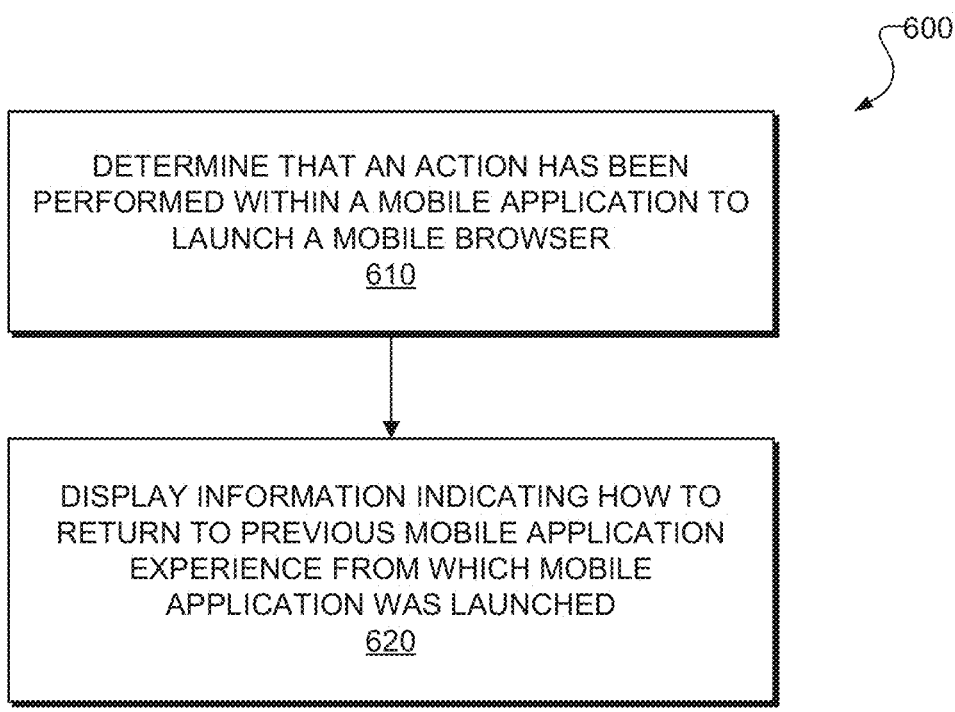
FIG. 6 is a flow diagram illustrating a method for navigating between a mobile browser experience and a mobile application experience, in accordance with some embodiments.

FIG. 6 is a flow diagram illustrating a method 600 for navigating between a mobile browser experience and a mobile application experience, in accordance with some embodiments. It is contemplated that the operations of method 600 may be performed by a system or components of a system (e.g., navigation engine 150). It will be appreciated that the method 600 may be performed on any suitable hardware. Although operations are described below as being performed by the navigation engine 150 and its modules, it is contemplated that other systems, engines, and/or modules may perform these operations as well. At operation 610, the navigation engine 150 determines that the mobile browser 140 has been launched on the mobile device 100, such as described above with respect to operation 310 in FIG. 3. At operation 620, information indicating how the user can return to a previous mobile application experience from which the mobile browser was launched can be displayed on the mobile device. In some embodiments, the displayed information can indicate that a navigation element is associated with returning to the previous mobile application experience. This display operation 620 may be conditioned upon a determination that no identifier for the mobile application has been registered with the operating system of the mobile device. It is contemplated that the operations of method 600 may incorporate any of the other features disclosed herein.

The systems, methods, and techniques described herein facilitate navigation between a mobile browser and a mobile application by associating one or more navigation elements of the mobile browser with various locations within the mobile application via uniform resource identifiers, or other identifiers, assigned to the locations of the mobile application.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules, engines, objects or devices that operate to perform one or more operations or functions. The modules, engines, objects and devices referred to herein may, in some example embodiments, comprise processor-implemented modules, engines, objects and/or devices.

Similarly, the methods described herein may be at least partially processor-implemented. For example, at least some of the operations of a method may be performed by one or more processors or processor-implemented modules. The performance of certain operations may be distributed among the one or more processors, not only residing within a single machine or computer, but deployed across a number of machines or computers. In some example embodiments, the processor or processors may be located in a single location (e.g., within a home environment, an office environment or at a server farm), while in other embodiments the processors may be distributed across a number of locations.

Example Mobile Device

Figure 7:
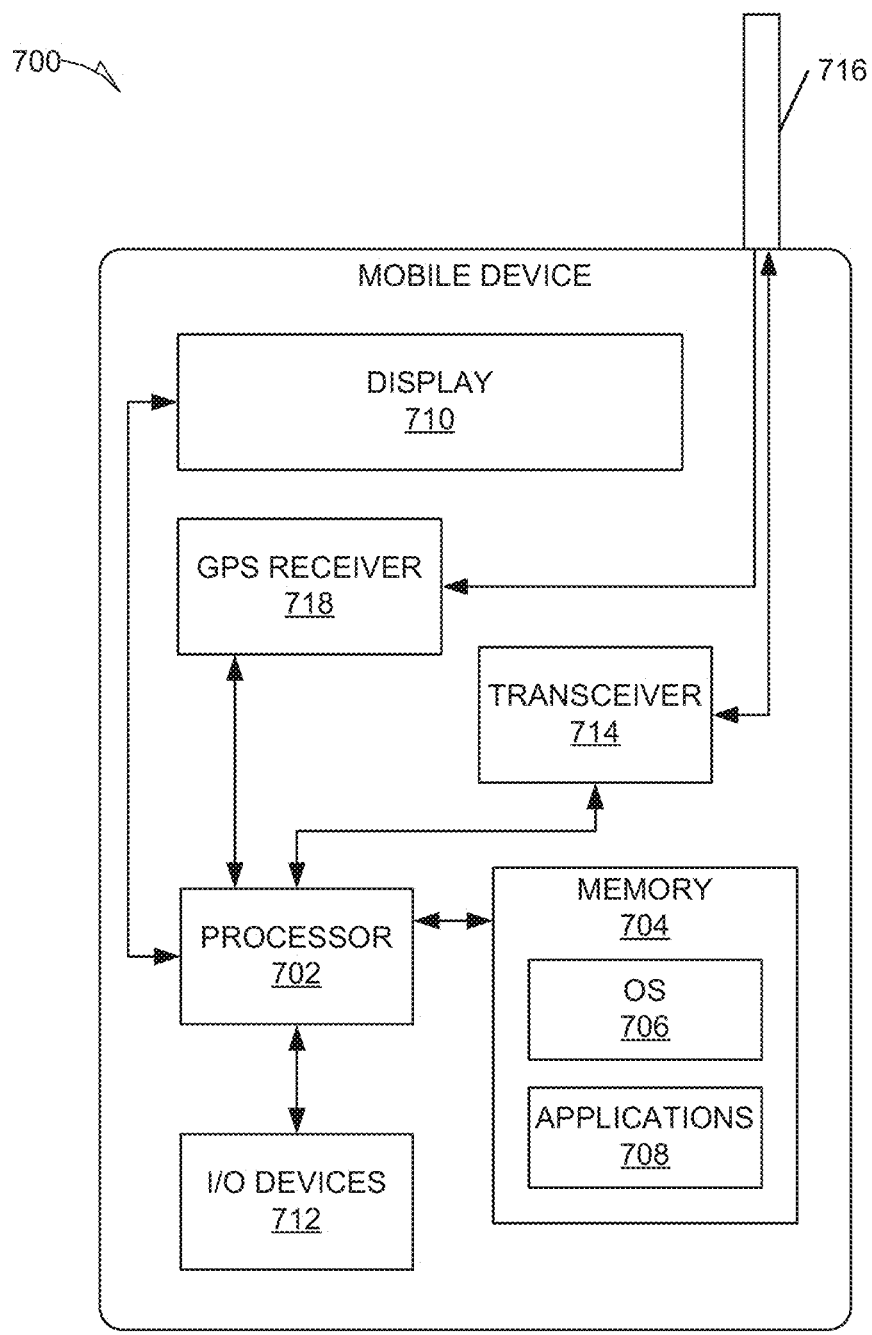
FIG. 7 is a block diagram illustrating a mobile device, in accordance with some embodiments.

FIG. 7 is a block diagram illustrating a mobile device 700, according to an example embodiment. The mobile device 700 may include a processor 702. The processor 702 may be any of a variety of different types of commercially available processors 702 suitable for mobile devices 700 (for example, an XScale architecture microprocessor, a microprocessor without interlocked pipeline stages (MIPS) architecture processor, or another type of processor 702). A memory 704, such as a random access memory (RAM), a flash memory, or other type of memory, is typically accessible to the processor 702. The memory 704 may be adapted to store an operating system (OS) 706, as well as application programs 708, such as a mobile location enabled application that may provide LBSs to a user. The processor 702 may be coupled, either directly or via appropriate intermediary hardware, to a display 710 and to one or more input/output (I/O) devices 712, such as a keypad, a touch panel sensor, a microphone, and the like. Similarly, in some embodiments, the processor 702 may be coupled to a transceiver 714 that interfaces with an antenna 716. The transceiver 714 may be configured to both transmit and receive cellular network signals, wireless data signals, or other types of signals via the antenna 716, depending on the nature of the mobile device 700. Further, in some configurations, a GPS receiver 718 may also make use of the antenna 716 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 8:
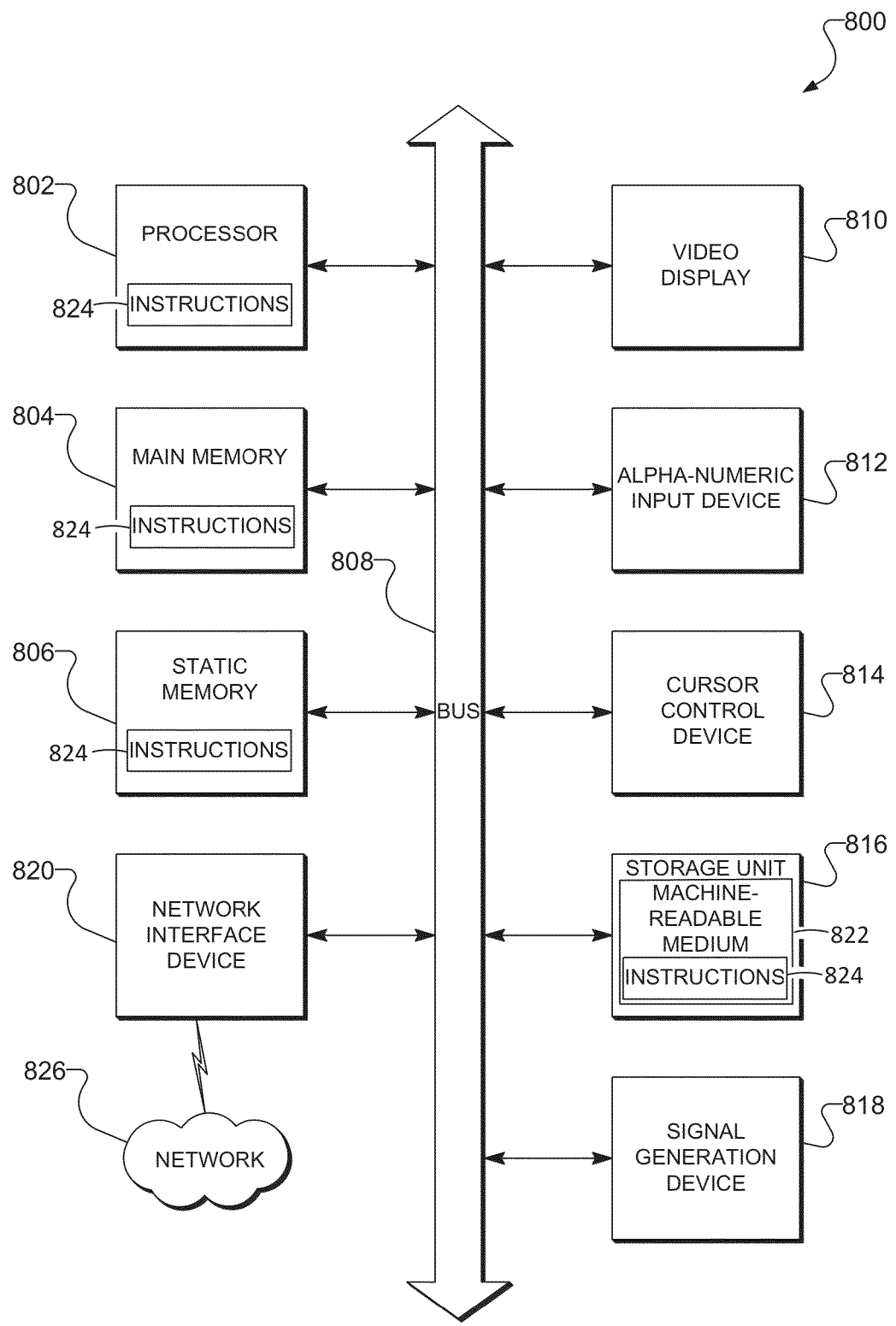
FIG. 8 is a block diagram of an example computer system on which methodologies described herein may be executed, in accordance with some embodiments.

FIG. 8 is a block diagram of an example computer system 800 on which methodologies described herein may be executed, in accordance with an example embodiment. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard or a touch-sensitive display screen), a user interface (UI) navigation device 814 (e.g., a mouse), a disk drive unit 816, a signal generation device 818 (e.g., a speaker) and a network interface device 820.

Machine-Readable Medium

The disk drive unit 816 includes a machine-readable medium 822 on which is stored one or more sets of instructions and data structures (e.g., software) 824 embodying or utilized by any one or more of the methodologies or functions described herein. The instructions 824 may also reside, completely or at least partially, within the main memory 804 and/or within the processor 802 during execution thereof by the computer system 800, the main memory 804 and the processor 802 also constituting machine-readable media.

While the machine-readable medium 822 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 824 may further be transmitted or received over a communications network 826 using a transmission medium. The instructions 824 may be transmitted using the network interface device 820 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
   determining, by at least one processor, that an action has been performed within a mobile application on a mobile device to launch a mobile browser on the mobile device;
   registering an identifier for the mobile application within an operating system of the mobile device, the identifier is a uniform resource identifier (URI);
   responsive to a determination that the identifier for the mobile application has been registered with the operating system of the mobile device, associating a navigation element of the mobile browser with the identifier for the mobile application, the navigation element is a selectable back button;
   responsive to a determination that no identifier for the mobile application has been registered with the operating system of the mobile device, displaying, on a page within the mobile browser, one or more instructions indicating how a user can return to a previous mobile application experience from which the mobile browser was launched on the mobile device, the one or more instructions being distinct from any selectable navigation element on the page, the one or more instructions identifying a selectable user interface element associated with returning to the previous mobile application experience, the one or more instructions being displayed concurrently with the selectable user interface element;
   receiving an indication of a selection of the navigation element within the mobile browser associated with the identifier for the mobile application; and
   re-launching the mobile application in response to receiving the indication of the selection of the navigation element of the mobile browser.

2. The method of claim 1, wherein associating the navigation element of the mobile browser with the registered identifier comprises modifying a browser history of the mobile browser.

3. The method of claim 2, wherein modifying the browser history of the mobile browser comprises rewriting the browser history.

4. The method of claim 2, wherein modifying the browser history of the mobile browser comprises creating a new entry for the browser history.

5. The method of claim 1, wherein the action comprises a selection of a selectable link presented within the mobile application.

6. A system comprising:
   a memory;
   at least one processor coupled to the memory;
   a launch determination module configured to determine that an action has been performed within a mobile application on a mobile device to launch a mobile browser on the mobile device;
   a resource assignment module configured to register an identifier for the mobile application within an operating system of the mobile device, the identifier is a uniform resource identifier (URI);
   a browser modification module, executable by the at least one processor, configured to, responsive to a determination that an identifier for the mobile application has been registered with an operating system of the mobile device, associate a navigation element of the mobile browser with the identifier for the mobile application, the navigation element is a selectable back button;
   a display module configured to, responsive to a determination that no identifier for the mobile application has been registered with the operating system of the mobile device, display, on a page within the mobile browser, one or more instructions indicating how a user can return to a previous mobile application experience from which the mobile browser was launched on the mobile device, the one or more instructions being distinct from any selectable navigation element on the page, the one or more instructions identifying a selectable user interface element associated with returning to the previous mobile application experience, the one or more instructions being displayed concurrently with the selectable user interface element; and
   a navigation engine configured to receive an indication of a selection of the navigation element within the mobile browser associated with the identifier for the mobile application, and the navigation engine further configured to re-launch the mobile application in response to receiving the indication of the selection of the navigation element of the mobile browser.

7. The system of claim 6, wherein the browser modification module is further configured to modify a browser history of the mobile browser.

8. The system of claim 7, wherein the browser modification module is further configured to modify the browser history of the mobile browser by rewriting the browser history.

9. The system of claim 7, wherein the browser modification module is further configured to modify the browser history of the mobile browser by creating a new entry for the browser history.

10. The system of claim 6, wherein the action comprises a selection of a selectable link presented within the mobile application.

11. A non-transitory machine-readable medium embodying a set of instructions that, when executed by a processor, cause the processor to perform operations, the operations comprising:
    determining, by the processor, that an action has been performed within a mobile application on a mobile device to launch a mobile browser on the mobile device;
    registering an identifier for the mobile application within an operating system of the mobile device, the identifier is a uniform resource identifier (URI);
    responsive to a determination that an identifier for the mobile application has been registered with an operating system of the mobile device, associating a navigation element of the mobile browser with the identifier for the mobile application, the navigation element is a selectable back button;
    responsive to a determination that no identifier for the mobile application has been registered with the operating system of the mobile device, displaying, on a page within the mobile browser, one or more instructions indicating how a user can return to a previous mobile application experience from which the mobile browser was launched on the mobile device, the one or more instructions being distinct from any selectable navigation element on the page, the one or more instructions identifying a selectable user interface element associated with returning to the previous mobile application experience, the one or more instructions being displayed concurrently with the selectable user interface element;

receiving an indication of a selection of the navigation element within the mobile browser associated with the identifier for the mobile application; and re-launching the mobile application in response to receiving the indication of the selection of the navigation element of the mobile browser.

12. The non-transitory machine-readable medium of claim 11, wherein associating the navigation element of the mobile browser with the registered identifier comprises modifying a browser history of the mobile browser.

* * * * *